United States Patent Office 3,231,087
Patented Jan. 25, 1966

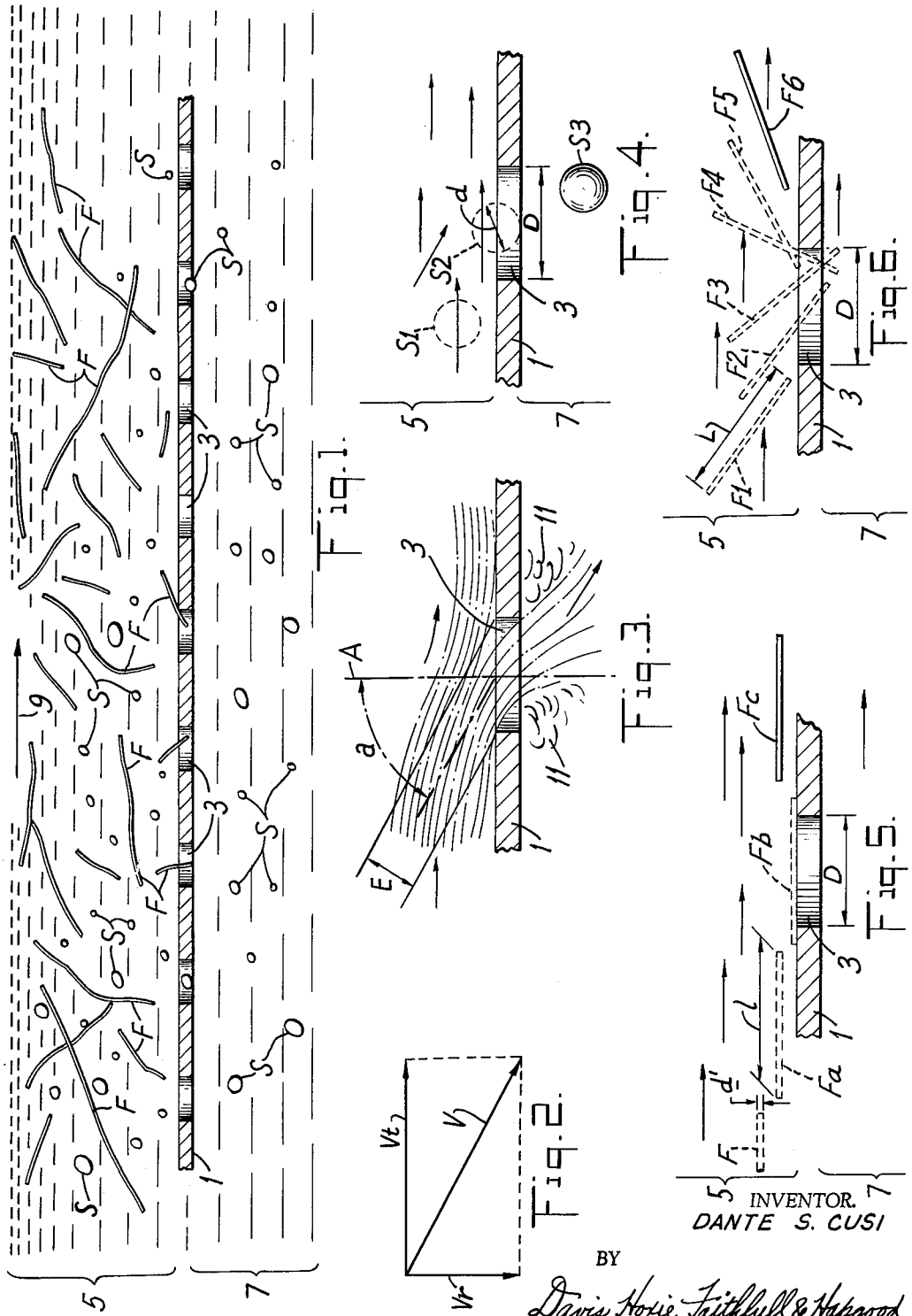

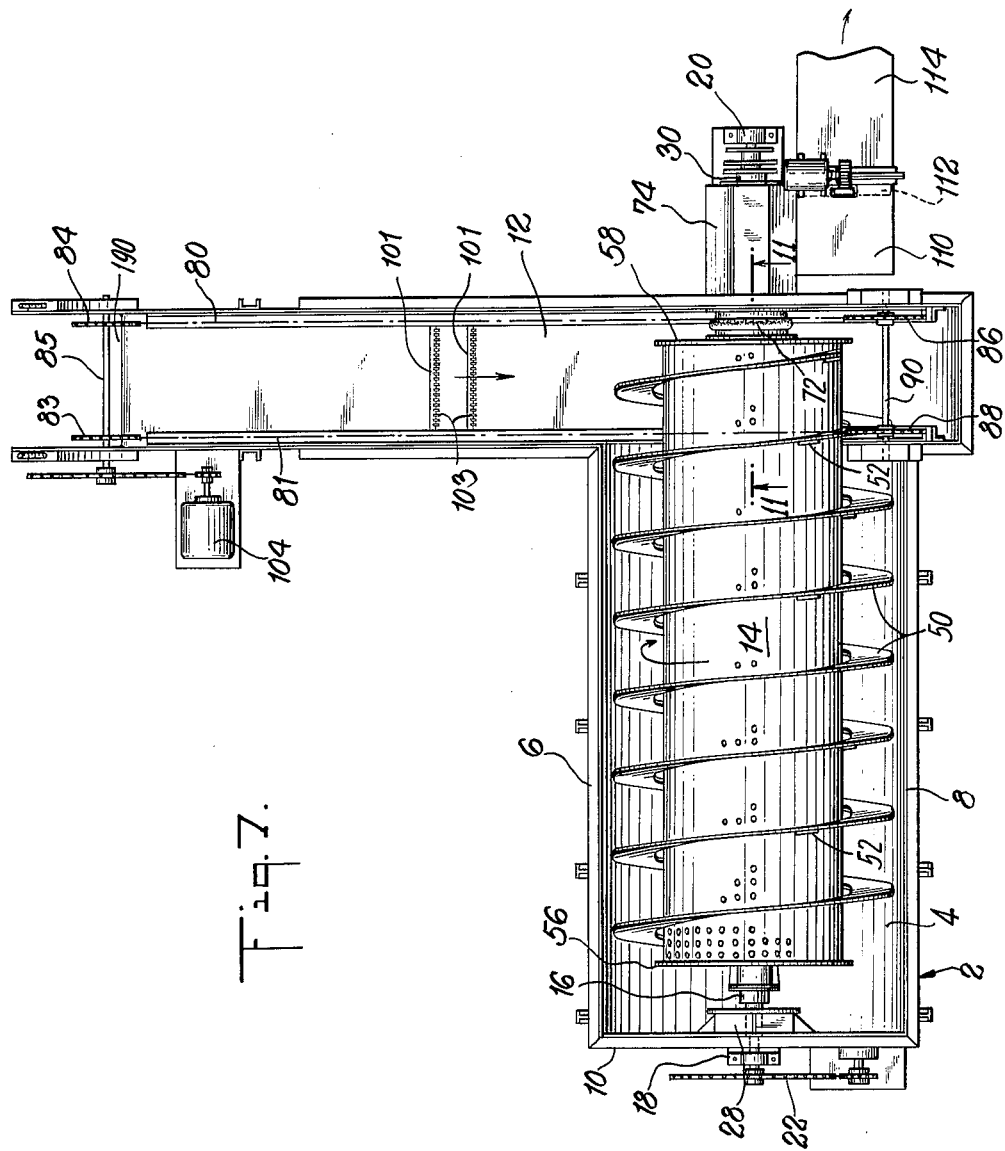

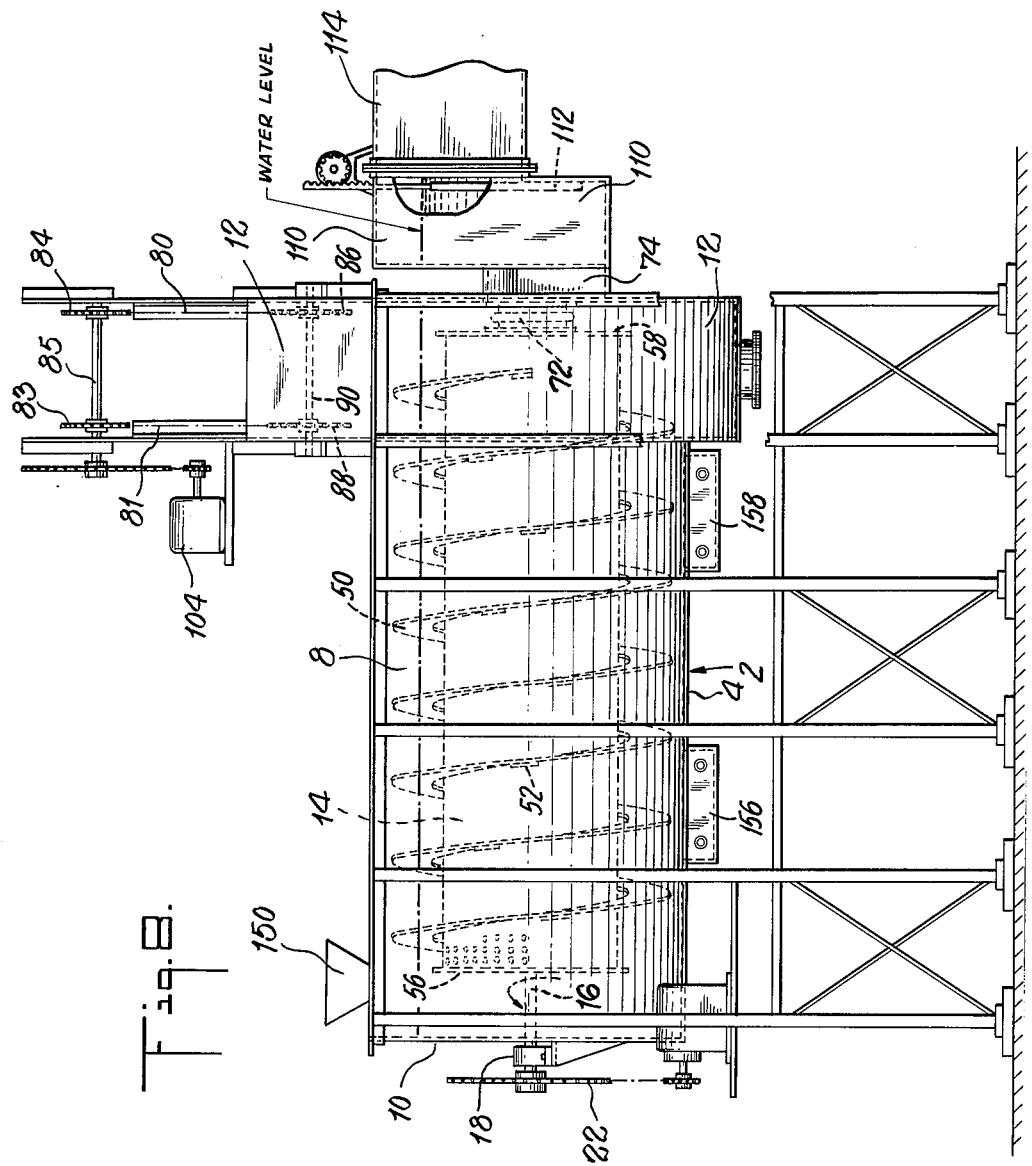

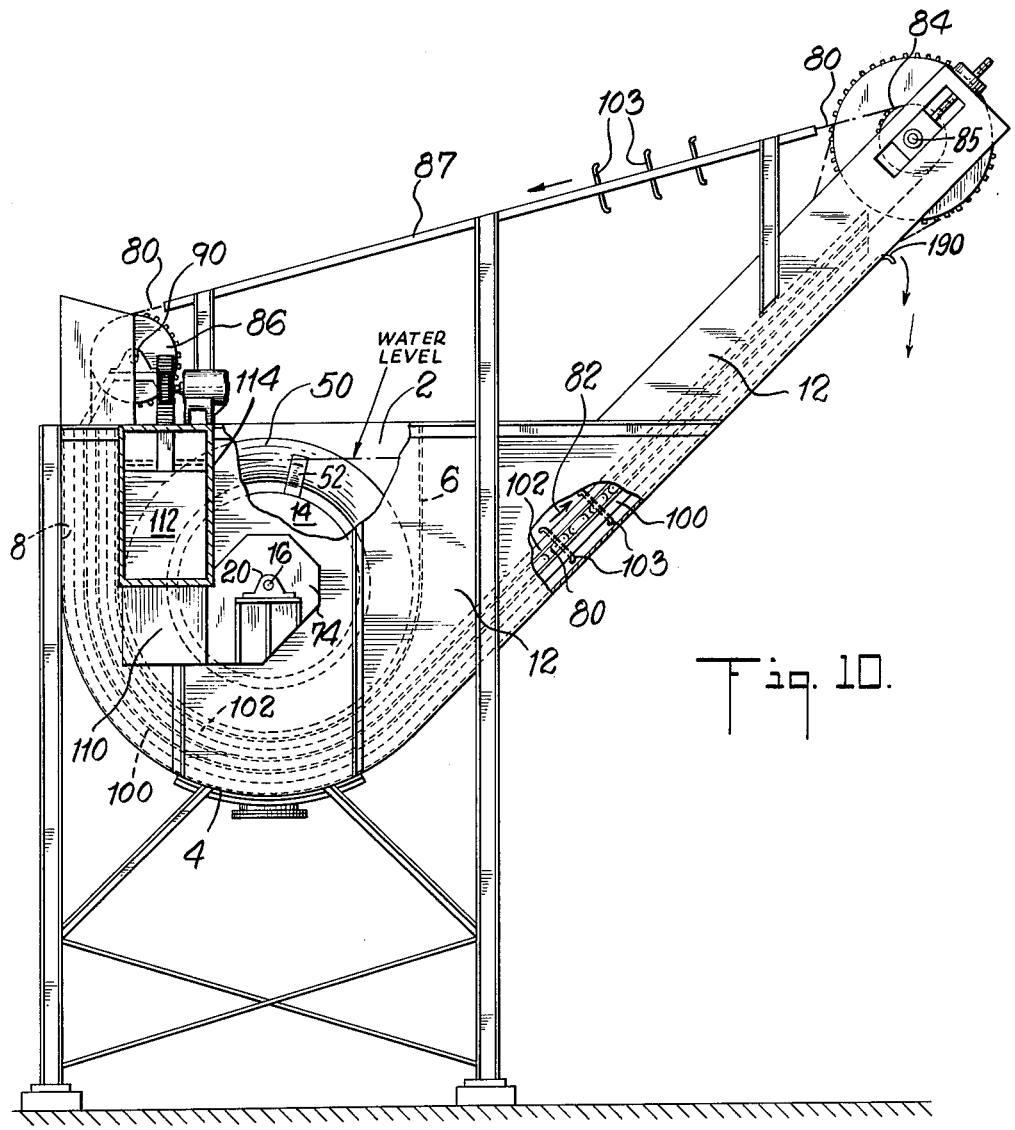

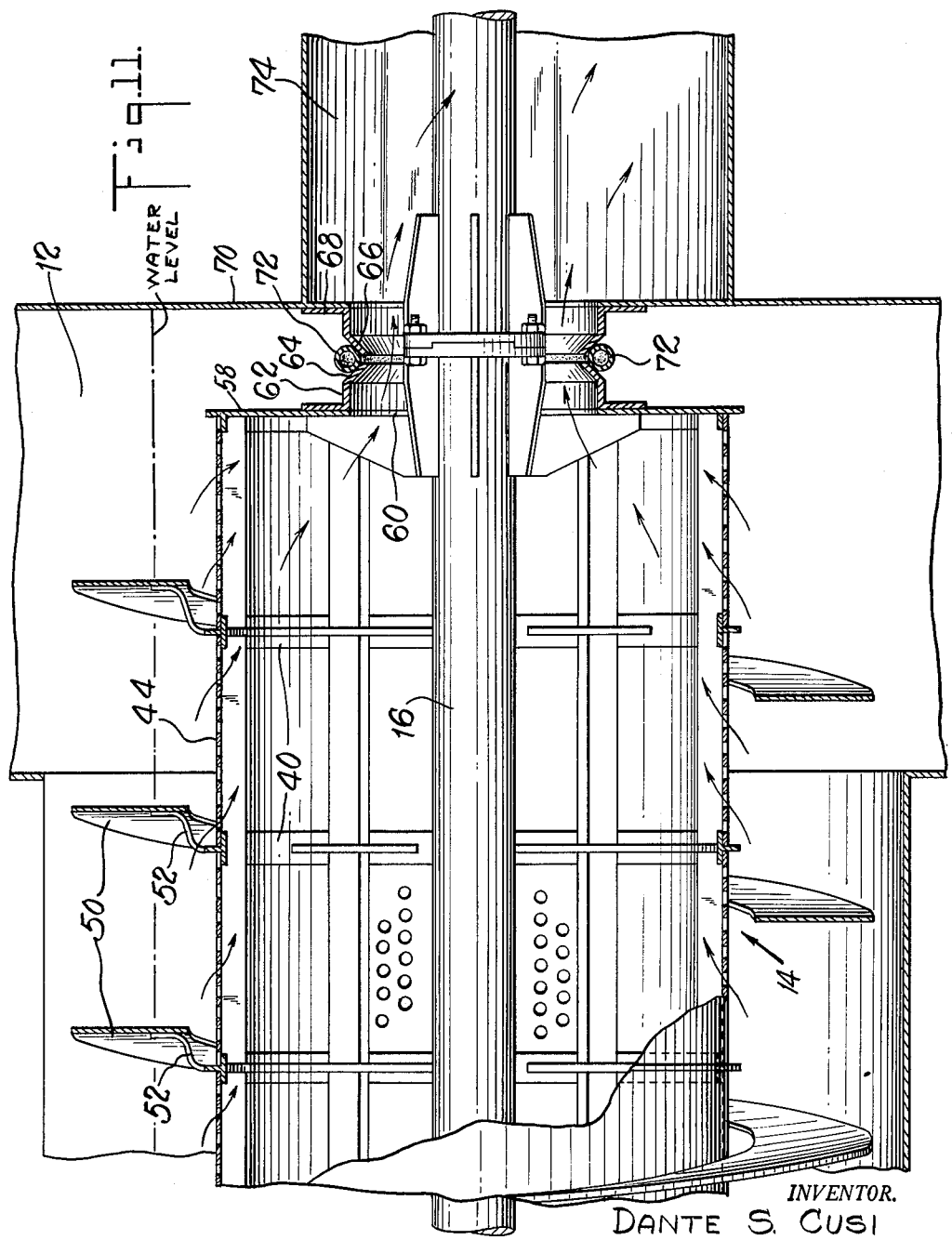

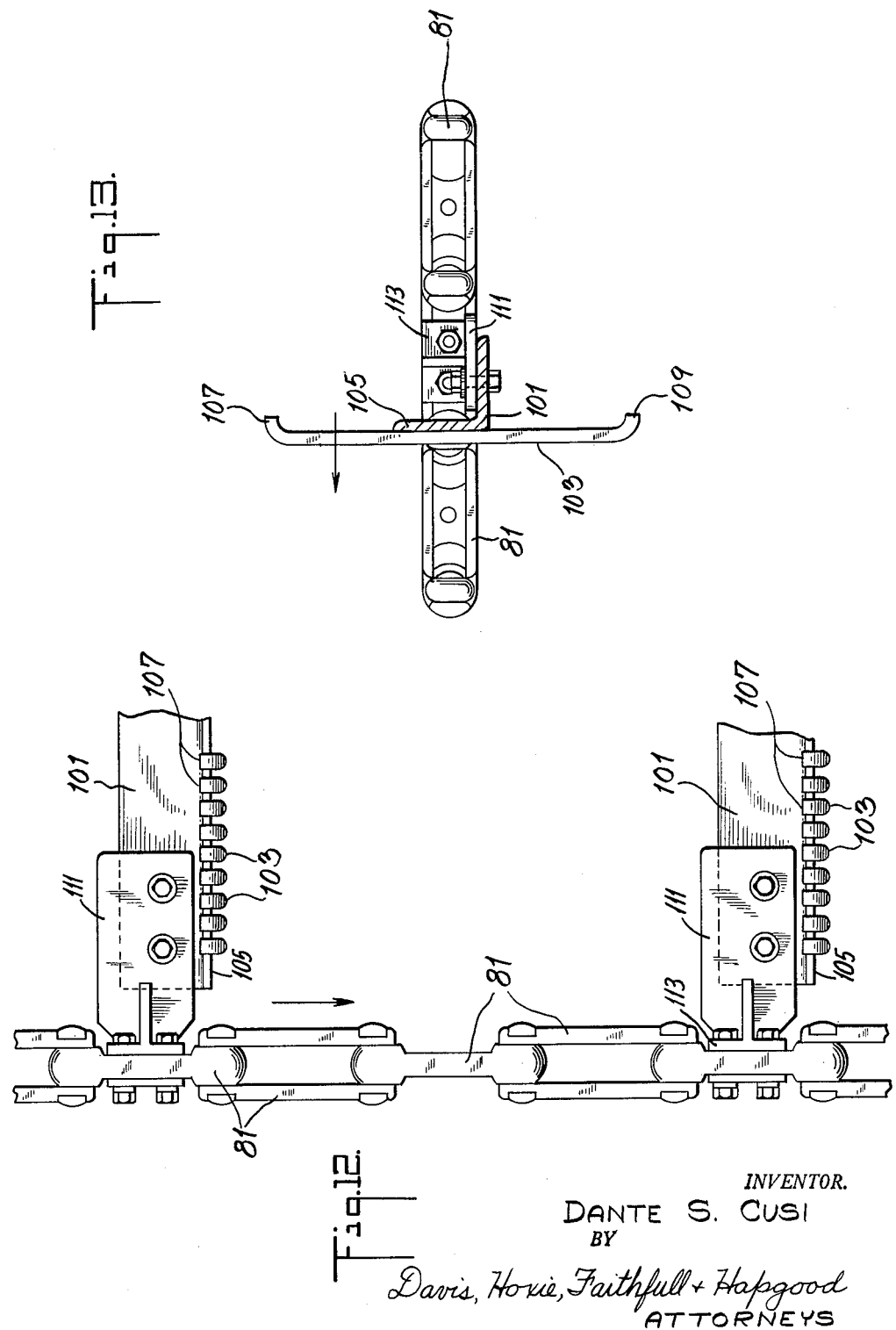

3,231,087
METHOD FOR SEPARATING SOLIDS IN LIQUID SUSPENSION
Dante S. Cusi, Lieja 8, Noveno Piso, Mexico City 6, Mexico
Filed Feb. 23, 1962, Ser. No. 174,996
4 Claims. (Cl. 209—250)

This invention relates to a novel method for the wet screening of a mixture of particles of different shapes, such as a mixture of fibers and non-fibrous material, to separate one from the other. It further relates to a procedure for screening particles of different shapes and sizes so that the separation of the fraction that is accepted by the screen from the rejected fraction is based on the shape as well as on the size of each particle.

The problem of separating fibers from non-fibrous materials has been a difficult one industrially. The non-fibrous particles, frequently spherical or spheroidal in shape, have diameters which are much larger than those of the fibers. The fibers, whether long or short, are of a length always considerably greater than the diameters of the non-fibrous particles. A screen should have holes large enough to accept the spheroidal non-fibrous particles and reject the fibers, even though the fiber has a diameter far less than that of any particle composing the non-fibrous portion.

There are many industrial operations which require separation of two such components of a mixture, typical of which is the separation of the fibrous portions of sugar cane from the non-fibrous, or pith, portions after the pith has been detached from the fibers by suitable treatment. As is known in the art, the production of an acceptable pulp from bagasse—the crushed residue of sugar cane mills—requires treatment of the bagasse to separate its fibrous portion from its pithy sponge portion (parenchyma) that is prevalent in the center of the cane, because the pithy material is not suitable for making chemical pulp and therefore should be eliminated before the fibers are chemically treated for pulp production. Although ways are known of performing the operation of scraping the fibers clean of pith, the separated pith portion remains intermixed with the scraped fibers. It is the object of the present invention to make a clean separation of one portion from the other.

In the drawings:

FIG. 1 is a diagram illustrating the screening operation;

FIG. 2 is a vector diagram of certain velocities involved;

FIG. 3 is an enlarged diagram of the water flow through an orifice in the screen;

FIG. 4 is a diagram of the operation of the screen on the accepted fraction of the suspension;

FIGS. 5 and 6 are diagrams of the operation of the screen on the rejected fraction;

FIG. 7 is a plan view of apparatus constituting a preferred form of my invention;

FIG. 8 is a front elevation view;

FIG. 10 is a side elevation view looking from the right in FIGS. 7 and 8;

FIG. 11 is a detail vertical section on the line 11—11 of FIG. 7;

FIG. 12 is a detail plan view of parts of the carrier chain, and

FIG. 13 is a detail side elevation view of the chain.

Figure 9:
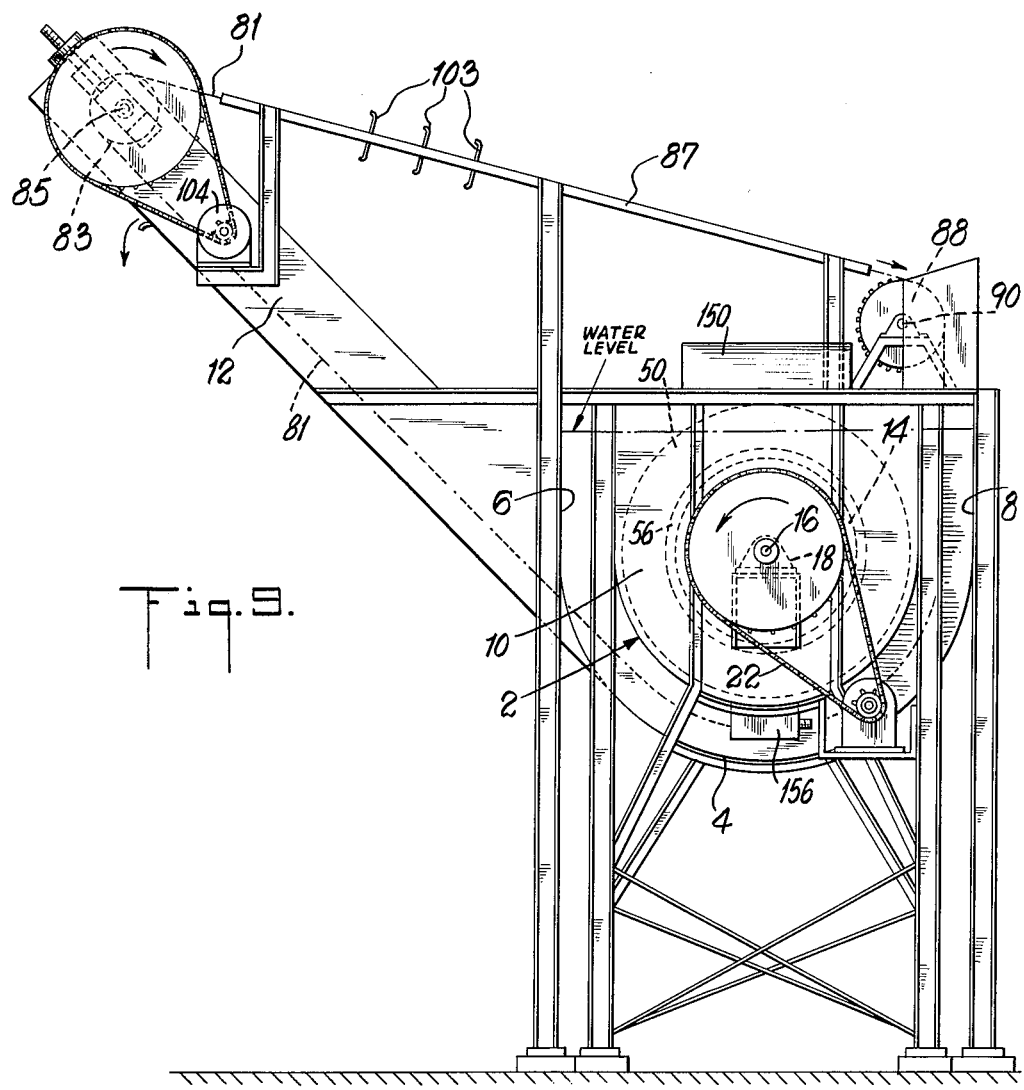
FIG. 9 is a side elevation view looking from the left in FIGS. 7 and 8.

The screening operation of the present invention requires the formation of a liquid suspension of the material to be screened. In order to obtain good results in the screening action, the specific gravity of the material to be screened should usually approximate the specific gravity of the liquid, so that the particles will be entrained by the motion of the liquid, avoiding any tendency to float or to sink. This is not always necessary, however, because with a down-flow screen the screening action would not be hampered if the spheroidal particles are heavier than the liquid and if the fibrous particles floated. But that would be a specific condition applicable only in selected instances.

Referring to the drawings, the suspension to be divided into separate fractions is composed of a group of particles F (FIG. 1) and a group of particles S. The particles F have their longest dimensions substantially greater and their shortest dimensions substantially smaller than any dimension of the particles S. Typically, the particles F may be the fibers and the particles S may be the pith portions of bagasse that have been treated to detach the pith from the fibers prior to the screening operation of the present invention.

The screening operation is illustrated diagrammatically in FIG. 1 showing at 1, in transverse section, a screen plate provided with holes 3 which may be round or of any other shape desired. The plate is submerged in the liquid body and may be disposed in any position, horizontally, vertically, or at any angle. In FIG. 1 the plate is horizontal, the zone at one side of the plate, designated 5, being occupied by the unscreened water suspension of the solids to be screened composed of fibers F and non-fibrous particles S, and the zone 7 on the opposite side of the screen being occupied by the suspension passed by the screen and being composed of the spheroidal particles S. The zone 5 is also occupied by the rejected fraction of fibers F.

A relative velocity is imparted to the suspension in zone 5 and the screen plate 1 in a direction transverse of the screen plate parallel with its plane. This relative velocity is indicated by the arrow 9 and although it is variable in amount for a purpose of adjustment which will appear, it is constant in direction and amount during the screening operation.

A further relative velocity is imparted to the suspension in zone 5 and the screen in a direction perpendicular to the screen, as by a hydrostatic head of the unscreened suspension portion in zone 5 if located above a plate which is horizontal, as shown. These simultaneously imparted velocities of the unscreened suspension relative to the screen plate in a direction transverse of and perpendicular to the plate produce a flow pattern illustrated in FIG. 3. In the vector diagram of FIG. 2, $Vt$ is the velocity of the liquid suspension relative to the screen plate 1 in the direction transverse of the plate, and $Vr$ is the velocity of the suspension relative to the plate in a direction perpendicular thereto. These velocities combine vectorially to produce the resultant velocity V, which roughly indicates the direction of the liquid flow through the screen holes. As indicated in FIG. 3, the flow is at an inclination to the axis A of the hole by an angle shown at $a$ as an approximation. The stream is of course modified by other factors producing secondary disturbances, at the hole edge, such as the eddy currents 11.

By utilizing the velocity V, the resultant of the velocities $Vt$ and $Vr$, there is produced the screening action shown diagrammatically in FIGS. 4 and 5. Assuming that a spheroidal particle S occupies at a given moment the position designated at S1, the flow of liquid through hole 3 depicted in FIG. 3 entrains the particle at S1 and draws it to the entrance to the hole 3. The diameter $d$ of the particle is substantially smaller than the diameter D of the hole 3. The liquid flow at the angle approximately a (FIG. 3) results in an apparent or effective size of the hole indicated at E, which is less than diameter D, and particle S is also smaller than the effective size E. The spheroidal particle accordingly passes through the hole as indicated at S2 flowing into the accepted zone 7, as indicated at S3.

FIGS. 5 and 6 show the action on a particle F having a length $l$ which is larger than the diameter D of the hole 3 and a diameter $d'$ substantially smaller than the diameter D of the hole 3. A large portion of this group of particles will become oriented by the velocity V$t$, in a direction transverse of the screen plate. If the elongated or fiber-like particle F$a$ (FIG. 5) strikes the screen hole in a position transverse of the hole (F$b$), it will be rejected (F$c$) without difficulty and thus the portion of the F group of particles which are so oriented transversely of the holes will compose a part of the rejected fraction. If, however, the fiber F approaches the hole 3 in the position F$l$ (FIG. 6), with its long axis L oriented substantially in the direction of flow of the suspension approaching the hole (FIG. 3), it will, like the spheroidal particle S in FIG. 4, move downwardly as the liquid enters the hole as shown in the successive positions F2 and F3 until it strikes the hole edge at position F4. In this position the particle at F4 will be pulled by the flow of the stream over the screen away from the hole as shown at F5 to be rejected at F6 so that it will remain in zone 5 as an addition to the rejected fraction.

The variables involved in the regulation of the system are the values of the velocities V$t$ and V$r$, which, in turn, are related to the effective size and shape of the hole 3. If velocity V$t$ is increased in relation to velocity V$r$, the resultant velocity V of the liquid stream will be directed more acutely to the screen plate, that is angle $a$ (FIG. 3) will increase, with the result that the proportion of the stream flowing through the hole 3 will decrease in relation to the portion of the stream that will flow along the screen plate. The effective hole size of the screen plate will be thus decreased and may accordingly be modified by varying the ratio between the values V$t$ and V$r$ such that if the value of V$t$ is increased in relation to the value of V$r$, the apparent or effective size of the hole will decrease. Thereby the screen will reject smaller particles, and conversely. In this way the ratio between the value of V$t$ and the value of V$r$ is a regulating factor influencing the screening action. The size of particles that can be accepted by the screen will increase inversely with the value of the factor V$t$/V$r$.

It is to be noted that it is the largest dimension of each particle which the screen discriminates. In other words, the screen is able to separate heteromorphous particles on the basis of their largest dimensions, even though the particles with the largest dimension in one direction may have the smallest dimension in another direction, such as a fiber.

In FIGS. 7 to 13, I have illustrated a preferred embodiment of apparatus which may be used in the practice of my novel screening method.

The apparatus illustrated has a tank 2 suitably mounted horizontally, with a bottom 4 having a cylindrical contour, and substantially vertical side walls 6 and 8. It has a closure 10 at one end and at the other empties into an inclined trough apparatus, designated generally at 12, to be described. Mounted within the tank in axial alignment with it, is a screening drum 14, carried by shaft 16, supported in bearings 18 and 20 and driven through drive 22. To avoid leakage from the tank to the outside, suitable packing glands 28 and 30 are provided.

Screening drum 14 is constructed of a metal or wooden frame 40 (FIG. 11) suitably mounted on shaft 16 to rotate therewith, to which frame, perforated metal plates 44 are suitably secured to form the drum, which is preferably generally cylindrical in outline. Around the outside surface of the drum, a continuous helicoidal plate 50 is secured by suitable brackets 52, protruding at intervals from the frame 40. The helicoidal plate rotates with the drum to conduct the liquid suspension from the inlet 150 through the tank 2 to the trough 12 during the screening process.

Drum 14 is closed at one end by cover plate 56 and at its other end by cover 58 which is annular and has a central opening 60 (FIG. 11) through which liquid within the drum finds egress by way of the neck 62 fixed to the cover plate 58 to rotate with the drum. The neck 62 converges in a tapering frusto-conical end 64, matching a similar frusto-conical end 66 of a neck 68 welded to the side wall 70 of the trough 12. The matching conical surfaces 64 and 66 function to retain a packing ring 72 in the form of a soft, hollow, annular rubber gasket bearing against the rotating conical surface 64 and the stationary conical surface 66 to seal the gap between the rotating and stationary members to assure that all the liquid leaving the tank passes first through the holes in the drum. The liquid flows thence into chamber 74 sealed to the side wall 70 of the trough, as indicated by arrows in FIG. 11. Chamber 74 in turn communicates with outlet duct 110 (FIGS. 7, 8 and 10) containing an adjustable gate 112 covering outlet 114 and which can be raised or lowered to control the level of the liquid inside the drum and to afford adjustability to the operation, as will be described. The portion of the suspension accepted by the screen thus is delivered from the machine through outlet 114.

The trough 12, which receives the rejected portion of the suspension, inclines upwardly toward the rear of the machine as shown in FIGS. 9 and 10. It contains a conveyor chain mechanism composed of a pair of chains 80 and 81 (FIG. 7) advancing in the direction of the arrow 82 (FIG. 10). The chains 80 and 81 are trained over a pair of sprockets, 84 and 83, respectively, fixed to shaft 85, thence over a supporting platform 87 to a pair of sprockets 86 and 88, mounted on idler shaft 90. Each chain is guided thence by guides 100 and 102, shown for the chain 80 in FIG. 10 in its course around the drum and upwardly in the trough 12. The chain mechanism is driven by motor 104 (FIG. 7) suitably connected to shaft 85.

Extending between the chains 80 and 81, at suitably spaced intervals, is a series of rakes, each of which, as shown in FIGS. 12 and 13, is provided with a plurality of tines 103 soldered to the upright members 105 of angle bars extending between and suitably secured to the opposite chains 81 and 80. The details of how they are secured are not important, but I have shown the angle bars as having horizontal members 101 bolted to plates 111 of brackets having uprights 113 mounted on the chains at the desired corresponding intervals. The tines as shown in FIG. 13 extend equidistantly above and below the chains and are given a right angle bend opposite the direction of their travel at their upper and lower extremities 107 and 109, respectively.

At 156 and 158 (FIG. 8) are two auxiliary water inlets to the tank.

The suspension of fibrous and non-fibrous material to be screened is introduced to the machine through inlet 150, FIG. 8. The drum is rotated in the direction of the arrow counterclockwise as viewed in FIG. 9 so that the suspension moves from left to right as viewed in FIGS. 7 and 8.

The successive flights of the helicoid form a number of contiguous courses of a helical channel bounded inwardly by the surface of drum 14, outwardly by the side and bottom walls of the tank 2 and separated by successive flights of the helicoid. The water level for a typical operation is shown in FIG. 8. Little of the liquid flows from one to the other of successive courses of the channel.

The zone outside and surrounding the drum in which the suspension to be screened is located is the zone 5 of FIG. 1 and the area within the drum is zone 7. Although the suspension in zone 5 tries to follow the rotating movement of the drum, there is a braking action, tending to hold the suspension back, as the result of the frictional engagement of the suspension with the stationary walls of the vat, so that there is a relative motion between the screen and the suspension surrounding it, represented by the arrow 9 in FIG. 1 or the vector $Vt$ in FIG. 2. The pressure of the water against the drum from the hydrostatic head forces the water through the perforations into the interior of the drum with a velocity represented by vector $Vr$.

As the screening operation progresses, water and the non-fibrous fraction of the suspension pass into the drum and are discharged, so that fibers outside the screen in the helical channel would become denser or more concentrated were it not for the auxiliary water supply introduced through inlets 156 and 158, as the screening progresses, in quantity sufficient to retain the optimum fiber to water ratio for effective screening with a minimum of screen obstruction.

The fibers in the helical channel are delivered by the helicoid to the trough 12, where the rakes convey the fibers up the incline to the outlet 190 where they are discharged from the machine.

The water containing the pith particles will flow through the chamber 74 and outlet duct 110 to be discharged through suitable deckers or filters for recovery of the pith and, if desired, recirculated through the machine. The tangential velocity $Vt$ of the screen plate in relation to the liquid suspension is obtained as above described by rotation of the drum and its speed can be set at any desired value, or a variable speed drive can be incorporated into the apparatus so that the velocity can be readily adapted to any given condition. Velocity $Vr$ can also be regulated readily. The amount of liquid that is carried away with the rejected fiber fraction, discharged through conveyor 12, is only that which either impregnates or adheres to the fiber fraction. The remainder of the liquid can leave the apparatus only through the holes of the screen and thence through the outlet 114. If more water is fed into the machine, more water will leave the macihne through the screen holes with the result of increasing the value of $Vr$. Thus $Vr$ can be regulated by regulating the liquid feed. If the water feed is increased, the liquid level in the tank 8 will rise, automatically increasing the head between this level and the level of the out-going liquid that flows over gate 112. Accordingly, a very simple system for the proper regulation of the machine is to establish a fixed velocity $Vt$ through a constant rotational speed of screen cylinder 14, and vary $Vr$ simply by regulating the flow of liquid into the machine—the higher the flow, the higher the value of $Vr$ and the lower the value of ratio $Vt/Vr$.

If several machines are connected together with a channel in such a way that the liquid level in one machine would depend upon the liquid level in the others, an individual regulation of each can readily be obtained by lowering or raising its gate 112.

A most effective screening operation is obtained by my apparatus and method. The characteristics of bagasse, for example, are such that the scraping operation prior to screening, needed to free the fibers of the pithy material or parenchyma, must be done while the fibers are wet in order that they may be sufficiently flexible and pliant to withstand the needed scraping. But the pithy material, which, in nature, is intended as a water absorbing mechanism, swells in the presence of water and adheres to the fibers, making the separation into individual fractions, after the scraping, a difficult task and one which I have found can be accomplished effectively only under water by utilizing a suspension of the two components in accordance with my invention.

In my prior Patent No. 2,827,169, I have disclosed a unique construction of screening plate adapted for separating materials of the types here under consideration. The operation of the apparatus here described can be enhanced by using the screen plates of my patent in the construction of the drum of the present invention.

I claim:

1. The method of effecting the underwater screening separation, into two fractions, of a heterogeneous suspension of two groups of particles, the particles of the first group having their longest dimensions substantially greater and their smallest dimensions substantially smaller than any dimensions of the particles of the second group, which comprises forming an aqueous suspension supply of the mixture of particles, submerging in the suspension a perforated screen plate having holes which are uniformly substantially larger than any dimension of the particles of the second group and uniformly substantially smaller than the said longest dimensions of the particles of the first group, the screen presenting a substantially plane surface from one hole to each of the holes next adjacent thereto, applying the pressure of a hydrostatic head to the suspension to move the suspension to the holes while simultaneously relatively moving the suspension and the screen at a substantially constant predetermined velocity in a direction substantially parallel to the surface of the screen to produce a resultant velocity of the liquid portion of the suspension through the holes at a substantial inclination to the axes of the holes, entraining a portion of the particles of the first group with their longest dimensions at an inclination to the holes as they enter the holes by flow of the liquid at said resultant velocity, deflecting the said entrained portion of the particles of the first group against the edges of the holes into a rejected fraction by directing them against said edges by the flow of water at said resultant velocity, and passing the particles of the second group through the holes into an accepted fraction by said water flow.

2. The method as defined in claim 1 which includes the further step of varying the said inclination to said resultant velocity to accommodate the difference in relative sizes of the particles of the two groups.

3. The method as defined in claim 1 which includes the further step of varying the said inclination to accommodate the difference in relative sizes of the particles of the two groups by varying the said hydrostatic head.

4. The method as defined in claim 1 which includes the further step of varying the said inclination to said resultant velocity to accommodate the difference in relative sizes of the particles of the two groups by varying the velocity of relative motion of the suspension and the screen.

References Cited by the Examiner

UNITED STATES PATENTS

| | | | |
|---|---|---|---|
| 612,424 | 10/1898 | Kutter | 209—270 |
| 810,813 | 1/1906 | Sanguinetti | 209—269 |
| 830,349 | 9/1906 | Neurer | 209—269 |
| 1,494,529 | 5/1924 | Clarke | 209—270 |
| 1,675,613 | 7/1928 | Laird | 209—270 |
| 2,684,154 | 7/1954 | Damon | 209—250 |
| 2,824,644 | 2/1958 | Garland | 209—423 |
| 2,827,169 | 3/1958 | Cusi | 209—397 |
| 2,980,255 | 4/1961 | Aagard | 209—427 |

FOREIGN PATENTS 469,240   11/1950   Canada.

HARRY B. THORNTON, *Primary Examiner.*

HERBERT L. MARTIN, EDWARD J. MICHAEL,
*Examiners.*